Feb. 6, 1934.  L. E. JONES  1,946,022
CLEAN-OUT MECHANISM FOR FRUIT TREATING APPARATUS
Filed March 31, 1931

INVENTOR.
Lloyd. E. Jones.
BY Philip A. Minnis
ATTORNEY

Patented Feb. 6, 1934

1,946,022

UNITED STATES PATENT OFFICE 1,946,022

CLEAN OUT MECHANISM FOR FRUIT TREATING APPARATUS

Lloyd E. Jones, Santa Monica, Calif., assignor to Food Machinery Corporation, San Jose, Calif., a corporation of Delaware Application March 31, 1931. Serial No. 526,588

8 Claims. (Cl. 198—127)

This invention relates to fruit treating mechanism such as may be used in the fruit packing industry to clean, dry or polish fruit, and has particular reference to a mechanism for cleaning out the residual fruit in such an apparatus at the end of its run.

Among the most widely used types of apparatus, such as indicated above, are those machines in which the fruit, while being subjected to treatment, is supported upon and advanced by a series of substantially cylindrical supporting members mounted on fixed axes and arranged in parallel relation, so as to form article holding grooves therebetween, all the members being adapted for rotation in a common direction. The supporting members may be provided with bristles for brushing the fruit as it is advanced thereover, or with absorbent means for drying the fruit, or they may be just plain rollers.

In the operation of such machines, as is well known, the fruit tends to collect in the grooves between the rotating supporting members, where it remains without advancing so long as no additional fruit is fed to the apparatus. Upon additional fruit being fed to the machine, those pieces in the grooves are caused to advance over the tops of the rotating members due to friction with the supporting members, augmented by the urge of oncoming fruit behind. In this manner the fruit is advanced through the machine at a speed determined by the rate the fruit is fed thereto as long as additional fruit continues to be fed. When fruit ceases to be fed, however, the advance also ceases and the fruit in the grooves remains there, since the frictional contact with the supporting members is not in itself sufficient to cause movement of the fruit.

In running successive lots of fruit through such machines it is necessary to keep them separate from each other in order to prevent intermingling of the different lots and thus confusing different kinds of fruit or mixing fruit belonging to one grower with that belonging to another, and to do this it is necessary that each lot be run separately. As pointed out above, however, after the feeding of one lot is completed the advance of the fruit ceases, so that a certain amount remains in the machine and must be cleaned out before the next lot is fed, in order to prevent mixing.

Heretofore it has been the custom to clean out this residual fruit by hand, and in many cases this practice is extremely laborious and consumes a large amount of time, especially where the supporting elements are encased in a housing, as in washing machines or drying apparatus. It may readily be seen that in cases where large numbers of small lots of fruit are being treated, the time lost by delay due to the cleaning out operations necessary after running each lot reaches a considerable amount, and it is an object of my invention to prevent this loss by providing a mechanism for performing this step automatically, without the necessity of manual assistance.

For the purposes of this disclosure I have shown my invention applied to a brushing machine, and it will be seen that my novel clean out device is positioned above the rotating brushes in such machine and comprises an endless carrier means from which projects rigidly mounted aprons or baffles, in such manner that during the operation of the carrier means the path followed by the aprons causes them to contact with articles, such as pieces of fruit, resting on the brushes underneath, and to sweep them transversely of the brushes thus clearing them of all pieces of fruit which may be resting thereon. The driving mechanism for the carrier means is provided with a clutch so that the clean out mechanism may be brought into use only when needed, and during period of disuse may be stopped in position with the aprons out of the path of fruit advancing over the brushes so as not to interfere therewith.

For a more detailed description, reference may now be had to the drawing wherein like reference characters denote like parts throughout the several views.

Figure 1:
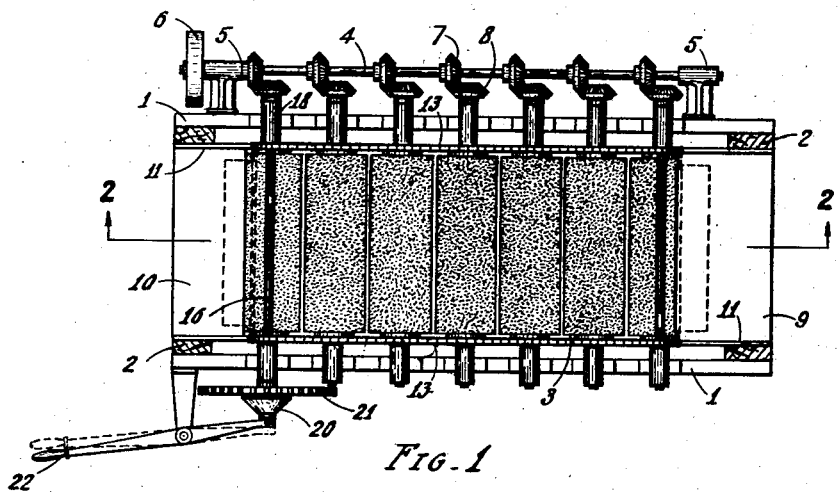
Figure 1 is a plan view of an apparatus embodying my invention.
Figure 2:
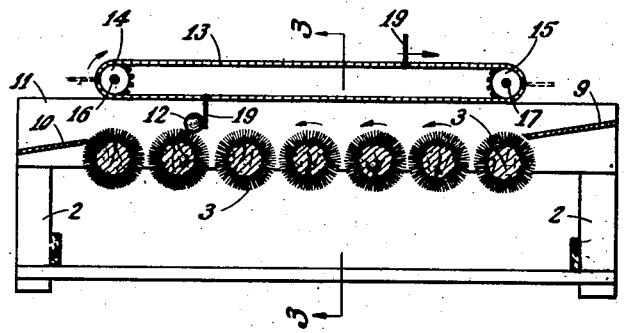
Figure 2 is a sectional elevation taken along the lines 2—2 of Figure 1.
Figure 3:
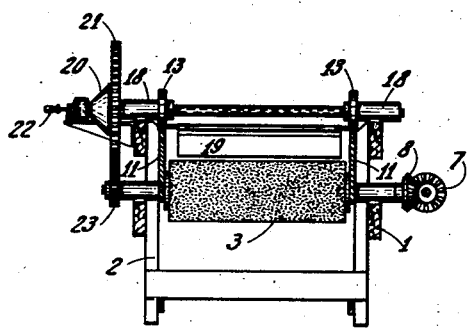
Figure 3 is a sectional view taken along the lines 3—3 of Figure 2.

The apparatus illustrated comprises a suitable supporting frame 1 provided with legs 2 and carrying a plurality of transversely disposed rotatable brushes 3, all of which are adapted to rotate in the same direction, so that the fruit is advanced across the brushes transversely to their axes.

The driving means for the brushes comprises a drive shaft 4 located to one side of the apparatus and mounted to rotate in bearings 5 secured to the frame 1. Power may be supplied to a suitable pulley 6 keyed to one end of the drive shaft. A plurality of bevel gears 7 are also keyed to the drive shaft and are adapted to mesh with corresponding gears 8, fixed to the outer ends of the brush axles. By this construction, when power is applied to the pulley 6, so that the brushes are caused to operate in the direction of the arrows, fruit to be treated may be fed onto the brushes over a suitable ramp 9 and as long as additional fruit continues to be fed it will be advanced transversely across the brushes and finally discharged therefrom over the discharge ramp 10. A pair of guide walls 11 are mounted adjacent the outer ends of the brushes and serve to keep the fruit thereon.

In the operation of the machine thus far described, when pieces of fruit 12 are fed onto the brushes over the ramp 9 they collect in the groove between the first two brushes until the groove is full, whereupon, when any additional pieces are fed their weight against the fruit in the groove operates to advance those pieces with which they contact, which are, thereupon, advanced over the top of the brush into the next groove, the newly fed pieces taking their places. In this manner, as long as the fruit is fed it is continually advanced over the brushes, the speed of advance being determined by the rate the fruit is fed to the brushes. When the supply is stopped, however, the advance stops, so that the fruit in the grooves remains there regardless of the rotating brushes.

In order to provide for automatically cleaning out this residual fruit there is provided a cleanout mechanism disposed above the brushes, comprising a pair of endless carrier chains 13 arranged on opposite sides of the machine and passing around aligned pairs of sprockets 14 and 15. The sprockets 14 and 15 are carried on shafts 16 and 17 respectively, which are rotatively mounted in suitable bearings 18. The lower runs of the chains 13 are preferably supported by the top edges of the side walls 11 in order to prevent sagging.

Sweeping means, such as aprons or baffles 19, are rigidly secured at their upper corners to the chains 13 in any suitable manner, and extend substantially the entire width of the runway provided by the side walls 11 and brushes 3. The aprons are preferably composed of some stiff yet yieldable or resilient material, such as leather or rubber, in order to prevent bruising of the fruit, and are of such size that their lower edges just clear the upper surface of the brushes as they are carried across their tops on the lower portion of their travel.

During the running of a load of fruit through the apparatus it is not desirable to have the cleanout mechanism in operation since it would interfere with the progress of the fruit over the brushes. As has been pointed out, the rate of progress of the fruit through the machine and, consequently, the amount of brushing it receives is dependent on the rate at which the fruit is fed to the brushes. In order to vary the amount of brushing it is desirable to vary the rate that the fruit is fed to the brushes in accordance with the condition of the fruit, whether it be comparatively dirty or more or less clean. To avoid the possibility of the cleanout mechanism sweeping out the fruit too quickly when an extra amount of brushing is desired, or retarding the progress of the fruit when only a small amount of brushing is required, means is provided for discontinuing the operation of the cleanout mechanism when desired. This takes the form of a friction clutch 20 disposed between the shaft 16 and the gear 21 and operated by the handle 22. The gear 21 is loosely mounted on the shaft 16 and meshes with a pinion 23 keyed to the outer extension of the end brush axle. By this construction when the shaft 4 is rotated and the handle 22 is in the position shown in full lines, the shaft 16 is rotated by the gear 21 and pinion 23, and the clean out mechanism is operated. When the handle 22 is moved to the dotted line position the clutch 20 is released, whereupon gear 21 idly rotates on the shaft 16 and the clean out mechanism is idle.

It is believed that the operation of the apparatus will now be clear. Normally, the clutch 20 is in inoperative position, and the clean out mechanism is idle, with the aprons 19 in the positions shown by the dotted lines where they are out of the way of articles advancing over the brushes. Fruit may now be fed to the brushes over which it is free to advance without interference by the clean out mechanism. When a lot of fruit has been entirely fed to the brushes and it is desired to clean out the residual pieces, the handle 22 is moved to the dotted line position, thus engaging the clutch 20, whereupon the aprons 19 are swept over the top of the rotating brushes 3, cleaning out the fruit in front of them. It is only necessary for one of the aprons to traverse its lower path of travel once and the clutch may then be disengaged, leaving the aprons in the dotted line positions where they are out of the path of the fruit on the brushes. Fruit may now be fed to the apparatus without interference by the clean out mechanism until its use is again desired.

Although I have described my invention as applied to a fruit brushing machine, its use is not confined thereto, but it is also applicable to other types of machines having other types of supporting means. For example, as heretofore pointed out, the apparatus may be used in connection with mechanism for washing or drying fruit or other articles passing over the supporting elements, and the supporting elements may be covered with other materials than bristles, or they may be plain surfaced. It will also be seen that various changes and modifications may be made in the details of the apparatus shown without departing from the spirit of my invention, and I deem myself entitled to all such modifications and variations as fall within the scope of the claims appended hereto.

Having now described my invention and in what manner the same may be used, what I claim as new and desire to protect by Letters Patent is as follows:

1. In an apparatus for treating rollable articles such as fruit and the like, a conveyor over which said articles are normally advanced while undergoing treatment at a speed determined by the rate said articles are fed thereto comprising a plurality of substantially cylindrical supporting elements arranged transversely of the path of said articles and in parallel relation so as to form article holding troughs therebetween, means for rotating said supporting elements in a common direction, said supporting elements being of such proportions relative to the size of articles being conveyed that such articles cannot be urged out of the troughs by the tractive effect of said elements alone but may be displaced therefrom by such tractive effect when augmented by the influence of additional articles deposited therein, article advancing means mounted for traversing movement over the conveyor to advance articles therealong, and disposable out of the path of articles on the conveyor so they may pass freely thereover, means for driving said article advancing means and means operable at the will of an operator for controlling said article advancing means to position the same in inoperative position out of the path of articles on the conveyor so they may pass freely thereover.

2. In an apparatus for treating rollable articles such as fruit and the like, a conveyor over which said articles are normally advanced while undergoing treatment at a speed determined by the rate said articles are fed thereto comprising a plurality of substantially cylindrical supporting elements arranged transversely of the path of said articles and in parallel relation so as to form article holding troughs therebetween, means for rotating said supporting elements in a common direction, said supporting elements being of such proportions relative to the size of articles being conveyed that such articles cannot be urged out of the troughs by the tractive effect of said elements alone but may be displaced therefrom by such tractive effect when augmented by the influence of additional articles deposited therein, a power driven carrier mechanism, means associated with the carrier mechanism for traversing movement over the conveyor to advance articles therealong, and means operable at the will of an operator for controlling the carrier mechanism to position and maintain its associated article advancing out of the path of articles on the conveyor so they may pass freely thereover.

3. In an apparatus for treating rollable articles such as fruit and the like, a conveyor over which said articles are normally advanced while undergoing treatment at a speed determined by the rate said articles are fed thereto comprising a plurality of substantially cylindrical supporting elements arranged transversely of the path of said articles and in parallel relation so as to form article holding troughs therebetween, means for rotating said supporting elements in a common direction, said supporting elements being of such proportions relative to the size of articles being conveyed that such articles cannot be urged out of the troughs by the tractive effect of said elements alone but may be displaced therefrom by such tractive effect when augmented by the influence of additional articles deposited therein, a normally idle endless carrier mechanism mounted upon fixed supports above said conveyor, article advancing means secured to said carrier mechanism and normally held thereby in idle position out of the path of articles on the conveyor so they may pass freely thereover, and means operable at the will of an operator for actuating said carrier mechanism to cause said article advancing means to traverse the conveyor and sweep articles therealong.

4. In an apparatus for treating rollable articles such as fruit and the like, a conveyor over which said articles are normally advanced while undergoing treatment at a speed determined by the rate said articles are fed thereto comprising a plurality of substantially cylindrical supporting elements arranged transversely of the path of said articles and in parallel relation so as to form article holding troughs therebetween, means for rotating said supporting elements in a common direction, said supporting elements being of such proportions relative to the size of articles being conveyed that such articles cannot be urged out of the troughs by the tractive effect of said elements alone, but may be displaced therefrom by such tractive effect when augmented by the influence of additional articles deposited therein, an endless carrier mechanism disposed above the conveyor at a sufficient elevation to clear articles passing over the conveyor, article advancing means secured to the carrier mechanism for traversing the conveyor and advancing articles therealong, and means operable at the will of an operator for controlling said carrier mechanism to position and maintain its associated article advancing means out of the path of articles on the conveyor so they may pass freely thereover.

5. In an apparatus for treating rollable articles such as fruit and the like, the combination of a conveyor of the type including a series of substantially cylindrical conveying elements mounted in side by side relation for rotation in a common direction about fixed axes transversely of the path of conveyed articles and so proportioned relative to the size of conveyed articles that the rate of advance of such articles is normally dependent upon and controllable by the rate of feed of additional articles thereto, a carrier mechanism mounted above said conveyor, means associated with said carrier mechanism for traversing said runway to advance articles therealong, said carrier mechanism being operative to remove its associated article advancing means out of the path of articles on the conveyor during each cycle of its operation so that such articles may pass freely over the conveyor, and means operable at the will of an operator for optionally actuating said carrier mechanism to carry the article advancing means into the path of articles on the conveyor to advance them therealong, or discontinuing the operation of the carrier mechanism independently of the conveyor to maintain the article advancing means out of the path of articles on the conveyor.

6. In an apparatus for treating rollable articles such as fruit and the like, the combination of a conveyor of the type including a series of substantially cylindrical conveying elements mounted in side by side relation for rotation in a common direction about fixed axes transversely of the path of conveyed articles and so proportioned relative to the size of conveyed articles that the rate of advance of such articles is normally dependent upon and controllable by the rate of feed of additional articles thereto, a carrier mechanism associated with said conveyor, a pusher member secured to said carrier mechanism in position to traverse the conveyor and sweep articles therealong, said pusher member being disposable by the carrier mechanism out of the path of articles on the conveyor so they may pass freely thereover, and means operable at the will of an operator for optionally actuating said carrier mechanism to move said pusher member to advance articles along the conveyor, or discontinuing the operation of the carrier mechanism independently of the conveyor to maintain the pusher member out of the path of articles on the conveyor.

7. In an apparatus for treating rollable articles such as fruit and the like, the combination of a conveyor of the type including a series of substantially cylindrical conveying elements mounted in side by side relation for rotation in a common direction about fixed axes transversely of the path of conveyed articles and so proportioned relative to the size of conveyed articles that the rate of advance of such articles is normally dependent upon and controllable by the rate of feed of additional articles thereto, a carrier mechanism associated with said conveyor, a resilient pusher member rigidly secured to said carrier mechanism in position to traverse the conveyor and sweep articles therealong, said pusher member being disposable by the carrier mechanism out of the path of articles on the conveyor so they may pass freely thereover, and means operable at the will of an operator for optionally actuating said carrier mechanism to move said pusher member to advance articles along the conveyor, or discontinuing the operation of the carrier mechanism independently of the conveyor to maintain the pusher member out of the path of articles on the conveyor.

8. In an apparatus for treating rollable articles such as fruit and the like, the combination of a conveyor of the type including a series of substantially cylindrical conveying elements mounted in side by side relation for rotation in a common direction about fixed axes transversely of the path of conveyed articles and so proportioned relative to the size of conveyed articles that the rate of advance of such articles is normally dependent upon and controllable by the rate of feed of additional articles thereto, article advancing means mounted for operation above said conveyor and disposable in inoperative position with relation thereto, means for driving said article advancing means, and means operable at the will of an operator to bring the article advancing means into operative relation for advancing articles over the conveyor.

LLOYD E. JONES.